(12) United States Patent
Geisberger et al.

(10) Patent No.: US 11,768,220 B2
(45) Date of Patent: Sep. 26, 2023

(54) ACCELEROMETER HAVING AN OVER TRAVEL STOP WITH A STOP GAP LESS THAN A MINIMUM ETCH SIZE

(71) Applicant: NXP USA, Inc., Austin, TX (US)

(72) Inventors: Aaron A. Geisberger, Austin, TX (US); Jun Tang, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/470,073

(22) Filed: Sep. 9, 2021

(65) Prior Publication Data

US 2023/0074541 A1    Mar. 9, 2023

(51) Int. Cl.
*G01P 15/125*    (2006.01)
*G01P 15/08*    (2006.01)

(52) U.S. Cl.
CPC ................ *G01P 15/125* (2013.01); *G01P 2015/0871* (2013.01)

(58) Field of Classification Search
CPC .......... G01P 15/125; G01P 2015/0871; B81B 3/0002; B81B 3/0013; B81B 3/0016; B81B 3/0051; B81C 1/0096
See application file for complete search history.

(56) References Cited

U.S. PATENT DOCUMENTS

| 6,626,040 B1* | 9/2003 | Pereira et al. .......... F42B 15/01 |
| | | 73/514.38 |
| 8,186,220 B2 | 5/2012 | Geisberger et al. |
| 8,952,466 B2 | 2/2015 | Classen et al. |
| 10,502,759 B2 | 12/2019 | Geisberger |
| 10,527,420 B2 | 1/2020 | Qiu et al. |
| 2005/0131482 A1 | 6/2005 | Mattes et al. |
| 2017/0082519 A1 | 3/2017 | Blomqvist et al. |
| 2018/0180419 A1 | 6/2018 | Geisberger |
| 2022/0194781 A1* | 6/2022 | Partanen ............. B81B 3/0051 |

FOREIGN PATENT DOCUMENTS

| DE | 102013208684 A1 * | 11/2014 .............. B81B 3/0013 |
| DE | 102019216535 A1 | 4/2021 |

* cited by examiner

*Primary Examiner* — Jill E Culler
*Assistant Examiner* — Ruben C Parco Jr

(57) ABSTRACT

A microelectromechanical systems (MEMS) accelerometer comprises a compliant spring structure with a first beam, a second beam, and a rigid structure. One end of the first beam and one end of the second beam are coupled to the rigid structure and a proof mass is coupled to another end of the second beam. Further, a spring anchor is coupled to another end of the first beam. In response to the proof mass moving, an extension coupled to the rigid structure moves in an opposite direction to motion of the proof mass to contact the proof mass and stop the movement of the proof mass.

10 Claims, 5 Drawing Sheets

$|\Delta y_{proof\,mass}| + |\Delta y_{extension}| \leq $ min etch gap

ACCELEROMETER HAVING AN OVER TRAVEL STOP WITH A STOP GAP LESS THAN A MINIMUM ETCH SIZE

FIELD OF USE

This disclosure generally relates to an accelerometer, and more particularly to an over travel stop in an accelerometer such as microelectromechanical systems (MEMS) accelerometer with a stop gap less than a minimum etch size which prevents motion of a proof mass beyond a desired range.

BACKGROUND

An accelerometer is a type of microelectromechanical systems (MEMS) device which measures acceleration. Typically, the MEMS accelerometer includes, among other component parts, a movable element, also referred to as a proof mass coupled to a compliant spring structure to allow movement of the proof mass in a linear direction. When the MEMS accelerometer experiences an acceleration, the proof mass also experiences the acceleration and moves as a result of the acceleration. The motion of the proof mass may then be converted into an electrical signal having a parameter magnitude (e.g., voltage, current, frequency, etc.) that is proportional to the movement of the proof mass such as the acceleration of the proof mass.

In some instances, the MEMS accelerometer experiences harsh accelerations or a high force which causes the proof mass to move beyond a desired distance or exhibit unstable behavior. Such movement or behavior can potentially damage the MEMS accelerometer. To reduce such damage, many MEMS accelerometers include one or more distance limiters, typically referred to as over travel stops anchored to a substrate. These over-travel stops allow the proof mass to travel a certain distance referred to as a stop gap before movement of the proof mass is limited by the over-travel stops so that the proof mass does not move beyond the desired distance.

Figure 1A:
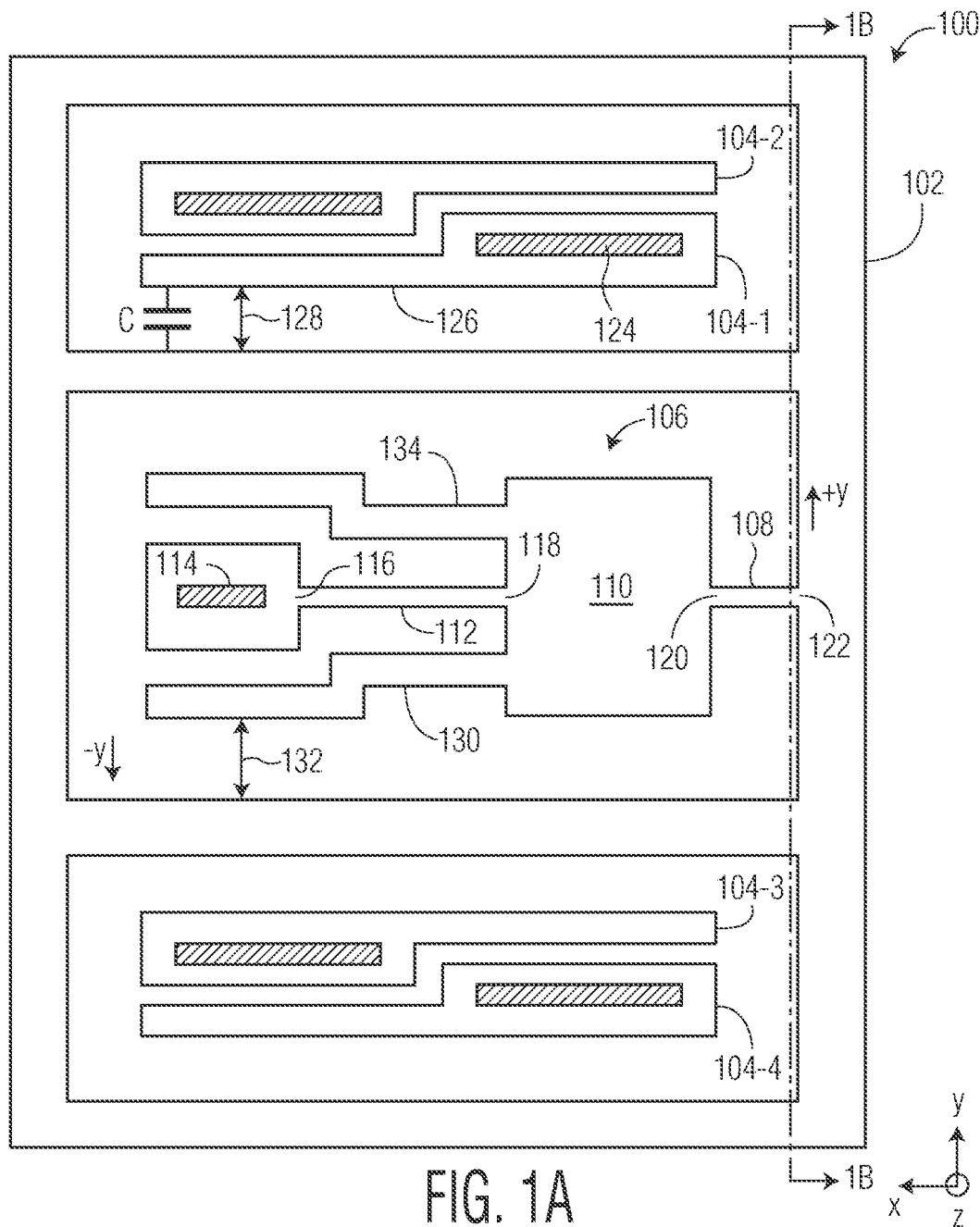
FIGS. 1A and 1B are a top view and side view respectively of an example microelectromechanical systems (MEMS) accelerometer in accordance with an exemplary embodiment of the invention.

The drawings are for the purpose of illustrating example embodiments, but it is understood that the embodiments are not limited to the arrangements and instrumentality shown in the drawings.

DETAILED DESCRIPTION

A stop gap is a distance that a proof mass is allowed to travel, or move, until an overtravel stop which is anchored to a substrate stops the proof mass from moving. The stop gap is typically a minimum etch size of a semiconductor process associated with fabricating the MEMS accelerometer and the proof mass is allowed to travel no more than the distance of the stop gap defined by the minimum etch size before the over travel stop stops the proof mass from moving.

If a stop gap is too large due to process limitations, then the proof mass might accelerate to a velocity such that contact with the overtravel stop results in chipping of the proof mass, chipping of the overtravel stop, or chipping of both the proof mass and the overtravel stop. Embodiments disclosed herein are directed to forming a stop gap which is smaller than or equal to and defined by the minimum etch size of the semiconductor process. In an example, the stop gap is controlled without changing a pitch of the semiconductor process. The proof mass is coupled to a compliant spring structure in the MEMS accelerometer which allows movement of the proof mass in a certain direction (e.g., linear direction) during an acceleration of the MEMS accelerometer. The compliant spring structure has a tension or stiffness k which causes the proof mass to move back to an initial position when the MEMS accelerometer is no longer subject to an acceleration. An over travel stop in the form of an extension to the compliant spring structure moves in the opposite direction in response to the motion of the proof mass when subject to an acceleration. The extension has a length which is sizeable to control a size of the stop gap and when the extension contacts the proof mass to stop the motion of the proof mass. The extension is anchored to a substrate via the complaint spring structure so that the extension stops the motion of the proof mass when the extension contacts the proof mass. The movement of the proof mass in one direction from a rest position and responsive movement of extension in the opposite direction to the movement of the proof mass has an absolute total displacement equal to a minimum etch size but the displacement of the proof mass is less than the minimum etch size such that the stop gap is less than the minimum etch size. The smaller stop gap results in a smaller velocity of the proof mass before the proof mass is stopped and reduces chances of proof mass, the extension, or both the proof mass and the extension being chipped or damaged as a result of contact compared to the proof mass traveling over a stop gap with a distance of the minimum etch size.

Figure 1B:
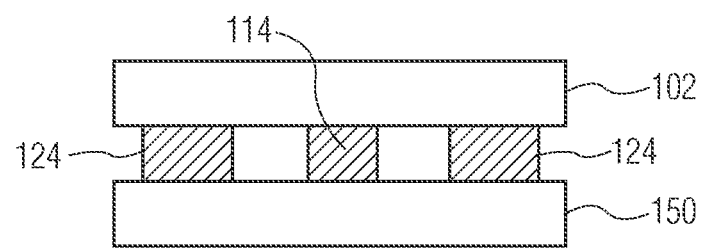

FIGS. 1A and 1B are top view and side view respectively of an example microelectromechanical systems (MEMS) accelerometer 100 in accordance with an exemplary embodiment of the invention. Accelerometer 100 represents a single axis accelerometer which measures an acceleration in a linear direction. The top view of FIG. 1A may show the accelerometer 100 in an xy plane with a z axis being orthogonal to the page. Further, in an example, the accelerometer 100 may have a proof mass 102, sense fingers 104-1 to 104-4, and a compliant spring structure 106 to measure the acceleration.

The proof mass 102 may be a known quantity of mass coupled to the compliant spring structure 106 which allow linear movement of the proof mass 102. In an example, the proof mass 102 and compliant spring structure 106 may made of a silicon material such as a single crystal silicon or polysilicon. In an example, a compliant mechanism such as the compliant spring structure is a flexible mechanism that achieves force and motion transmission through elastic body deformation. The compliant spring structure 106 may enable movement of proof mass 102 in a linear direction as a result of acceleration of the MEMS accelerometer 100 and resulting acceleration of the proof mass 102. Examples below describe the direction to be in a +y or -y direction for ease of illustration, but the proof mass 102 may move in other linear or non-linear directions. The compliant spring structure 106 may be composed of compliant members. In an example, the compliant members may include a flexible beam 108, a flexible beam 112, and rigid structure 110. Further, in an example, the flexible beam 108, flexible beam 112, and rigid structure 110 may be fabricated by semiconductor patterning and etching process of the silicon material and formed as a single unitary structure that provides a desired flexibility, stiffness, or rigidity. Further, the dimension and number of the flexible beam 108, the flexible beam 112, and the rigid structure 110 may be tuned to form the compliant spring structure 106 per a design preference. In an example, thickness of the beams may be 25 um with beams widths of 2 um and lengths of 100 um to 400 um.

The beam 112 may have respective ends 116, 118 along a longitudinal direction of the beam 112. The end 116 of the beam 112 may be coupled to a spring anchor 114 while the end 118 may be coupled to the ridged structure 110. The spring anchor 114 may be coupled to a substrate 150 as shown in the side view of FIG. 1B along cross section 1B of FIG. 1A. The substrate 150 may be stationary with respect to the motion of the proof mass 102 and fix the end 116 of the beam 112 from moving relative to the movement of the proof mass 102. In an example, the substrate 150 may be an underlying surface or support to the compliant spring structure 106 which in an example does not contact the proof mass 102. Further, the beam 108 may have respective ends 120, 122 along a longitudinal direction of the beam 108. The end 120 of the beam 108 may be coupled to the rigid structure 110 and the end 122 of the beam 108 may be coupled to the proof mass 102. The coupling of the ends 116, 118, 120, 122 may be a fixed joint which fixes the end to the spring anchor 114, proof mass 102, or rigid structure 110 without any rotational movement at the joint.

The sense fingers 104-1 to 104-4 may determine the acceleration of the proof mass 102. Further, the MEMS accelerometer 100 may have fewer or more sense fingers than what is illustrated.

For ease of explanation, structure and operation of sense finger 104-1 will be now described. The sense fingers 104-2 to 104-4 which have a similar structure and operate similarly may not be described for conciseness. The sense finger 104-1 may have an electrode 126 constructed from a silicon material. The electrode 126 may be anchored to the substrate 150 at an electrode anchor 124. By being anchored to the substrate 150, the sense finger 104-1 may be stationary relative to movement of the proof mass 102 so as to measure the movement of the proof mass 102 in response to acceleration. A sense gap 128 may separate the sense finger 104-1 from the proof mass 102 and be an insulating material such as air. The sense finger 104-1, sense gap 128, and proof mass 102 may form a capacitor shown as capacitance C. Further, movement of the proof mass 102 may alter a size of the sense gap 128 and resulting capacitance such that a differential capacitance as a function of time is indicative of movement such as acceleration of the proof mass 102. The differential capacitance may then be converted into an electrical signal having a parameter magnitude (e.g., voltage, current, frequency, etc.) that is proportional to the acceleration.

Sense fingers 104-1 to 104-4 may be positioned at various positions and orientations with respect to the proof mass 102 to measure acceleration of the proof mass 102. Capacitance between a sense finger and proof mass 102 may increase when the proof mass 102 travels in one direction and decrease when the proof mass 102 travels in another direction. For example, when the proof mass moves in a +y direction, then capacitance between the sense finger 104-1 and proof mass 102 may increase while a capacitance between the sense finger 104-2 and proof mass 102 may decrease. Alternatively, when the proof mass 102 moves in a -y direction, then capacitance of the sense finger 104-1 may decrease while a capacitance of the sense finger 104-2 may increase.

An over-travel stop allows a proof mass to travel a certain distance before the over travel stop stops the proof mass so that the proof mass does not move beyond the certain distance. A stop gap defines a distance that the proof mass is allowed to move until the proof mass is stopped. The stop gap typically has a size defined by an etch size of a semiconductor process. The etch size is a size of a gap produced by an etching process of the semiconductor process and is typically a minimum etch size defined by a minimum pitch size or minimum feature size of the semiconductor process. The over travel stop allows the proof mass to typically travel no more than the size of the stop gap defined by the minimum etch size before the over travel stop stops the proof mass from moving.

A small stop gap may be preferable to a larger stop gap so that the proof mass does not accelerate to velocities that cause chipping or damage of the proof mass, chipping or damage of the overtravel stop, or chipping or damage of both the proof mass and the overtravel stop when the over travel stop contacts the proof mass to stop the proof mass. But because the minimum etch size typically defines the size of the stop gap, the stop gap is limited by the semiconductor process and cannot be made any smaller than the minimum etch size without changing the pitch of the semiconductor process.

Embodiments disclosed herein are directed to the compliant spring structure 106 comprising an extension 130 which allows for forming the stop gap to be smaller than or equal to a minimum etch size and/or in some examples without changing the semiconductor process. In an example, the minimum etch size may define the stop gap. In an example, the extension 130 of the compliant spring structure 106 is arranged to travel responsively in a direction opposite to motion of the proof mass 102 to stop the proof mass 102 from moving as a result of acceleration. The opposite direction may be a direction other than direction of travel of the proof mass 102 such as substantially 180 degrees different from the motion of the proof mass 102. For example, as the proof mass 102 moves in the +y direction, the extension 130 moves in the -y direction. The movement of the end 122 causes the extension 130 to move in an opposite y direction resulting in the extension 130 contacting the proof mass 102 and stopping the motion of the proof mass 102 as a result of acceleration of the proof mass 102. A total displacement of the proof mass 102 and the extension 130 resulting from respective movement may define size of the stop gap. FIG. 1A shows a rest position of the compliant spring structure 106 and proof mass 102 when not subject to an acceleration. In an example, the proof mass 102 may move from this rest position as a result of acceleration in the +y direction and the extension 130 may responsively move in a -y direction such that a total absolute displacement of the proof mass 102 and the extension 130 is substantially the minimum etch size and the proof mass 102 may move less than the minimum etch size. In an example, the motion of the proof mass 102 and opposite motion of the extension 130 may reduce a size of the stop gap to less than the minimum etch size.

A separation 132 is a distance between the extension 130 and the proof mass when the proof mass 102 is not subject to an acceleration force. The separation 132 may be fabricated based on a semiconductor patterning and etching process in a silicon material to be substantially a minimum etch size to allow a total displacement of the proof mass 102 and extension 130 to be less than or equal to the minimum etch size. The separation 132 may then vary when the proof mass 102 is subject to an acceleration. Further, in an example, the extension 130 may be fabricated based on a semiconductor patterning and etching process in a silicon material to form a single unitary structure with dimension that provides a desired stiffness or rigidity. In an example, the extension 130 may have a 25 um thickness and a width on the order of order of 5 um to 10 um wide, but could be made as small as the minimum etch size, typically 2 um.

The compliant spring structure 106 may also have an extension 134 that operates in a manner similar to that of extension 130. Unlike the extension 130, the extension 134 may contact the proof mass 102 to stop the motion of the proof mass 102 if the proof mass 102 moves in a -y direction as a result of acceleration. The extension 130 may operate to stop the proof mass 102 in the stop gap less than the minimum etch size similar to that described with respect to the extension 130.

A size of the sense gap 128 associated with the sense finger 104-1 to 104-4 may also depend on the size of the stop gap. The size of the sense gap 128 may vary in proportion to the movement of the proof mass 102. In an example, the size of the sense gap 128 may be greater than the stop gap so that the motion of the proof mass 102 equal to the size of the stop gap does not result in the sense finger 104-1 to 104-4 contacting the proof mass 102 and producing an electrostatic latch up or short between the sense finger 104-1 to 104-4 and proof mass 102. Further, a resolution of acceleration measured by the sense finger 104 may depend on the size of the sense gap 128. A larger size of the stop gap may result in maintaining a larger sense gap 128 and less resolution of the acceleration measured by the sense finger 104-1 to 104-4. Conversely, a smaller size of the stop gap may result in maintaining a smaller sense gap 128 and higher resolution of the acceleration measured by the sense finger 104-1 to 104-4.

The smaller stop gap also results in higher restoring forces applied by the compliant spring structure 106 to mitigate stiction of the proof mass 102. Stiction is an undesirable situation which arises when surface adhesion forces are higher than the mechanical restoring force of the MEMS accelerometer 100. Stiction is recognized to often occur in situations where two surfaces with areas in close proximity come in contact. For example, the greater the contact area at both macroscopic and microscopic roughness levels, the greater the risk of stiction.

Figure 2:
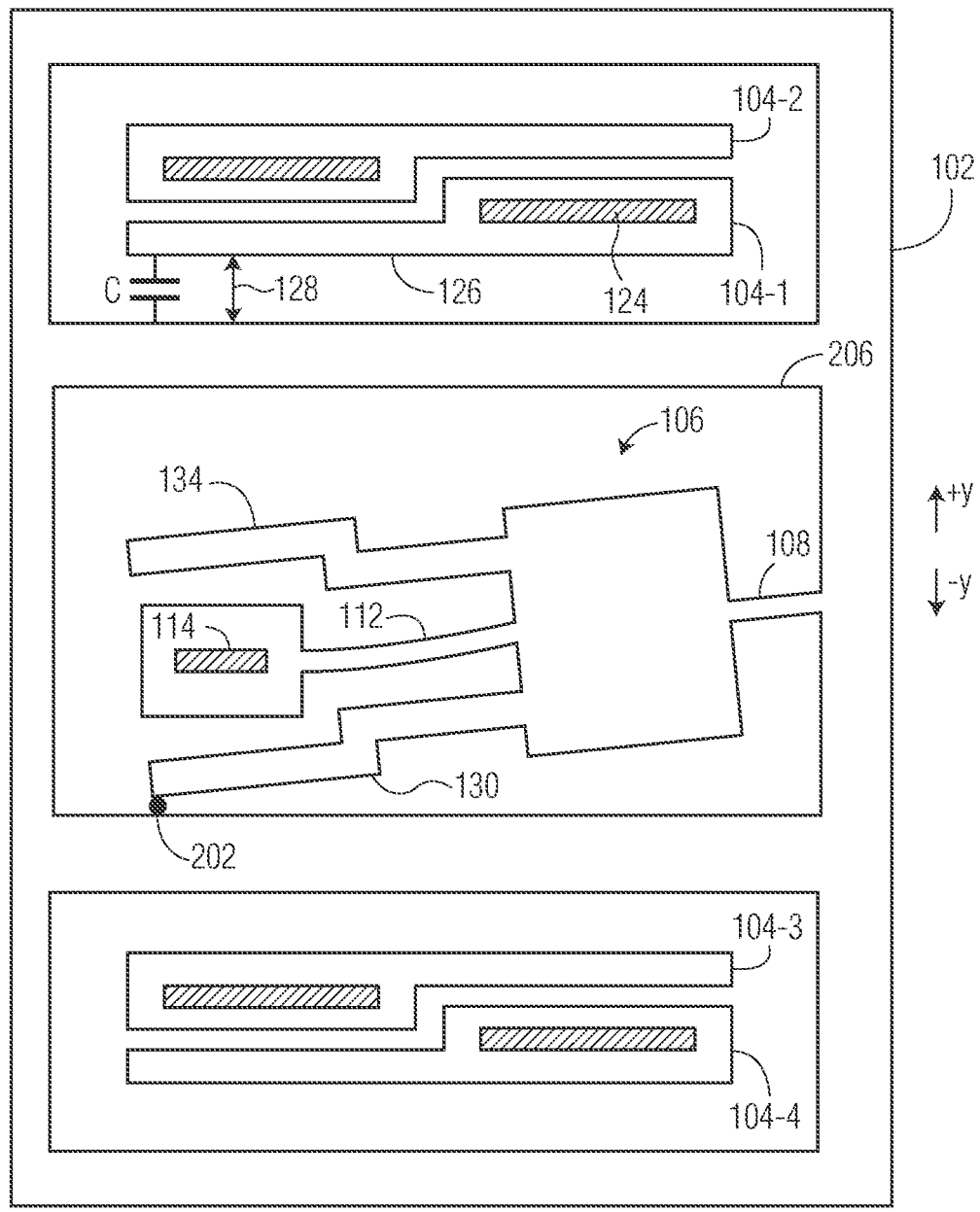
FIG. 2 illustrates operation of the MEMS accelerometer in accordance with an exemplary embodiment of the invention.

FIG. 2 illustrates operation of the MEMS accelerometer 100 in accordance with an exemplary embodiment of the invention. The operation may include illustrating motion of the proof mass 102 in one direction causing the extension 130 of the compliant spring structure 106 to move in an opposite direction to contact the proof mass 102 in accordance with an exemplary embodiment of the invention. Further, the motion may cause one or more of the beam 108 and beam 112 to deform because the spring anchor 114 is coupled to the substrate 150. The proof mass 102 may move in a +y direction as a result of acceleration which causes the extension 130 to move in a -y direction and contact the proof mass 102 at surface 202 to cause the proof mass 102 to stop moving because the extension 130 is coupled to the spring anchor 114 via the compliant spring structure 106. In an example, an end of the compliant spring structure 106 that is attached to the proof mass 102 may be given 1.1 um of displacement in the +y direction. The extension 130 responsively deflects 0.4 um in the -y direction to make contact with the proof mass 102 at point 202. The proof mass 102 and extension 130 may collectively move 1.5 um which is the minimum etch size but the extension 130 may contact the proof mass 102 and stop the motion after ~1.1 um of travel rather than a 1.5 um minimum etch size. The stop gap may be reduced by ~25% and allow a smaller sense gap. The relationship between the displacement of the proof mass 102 and extension 130 and the separation 132 may be represented by the following equation:

$Abs(\Delta y_{proof\ mess\ displacement}) + Abs(\Delta y_{extension\ displacement}) \leq$ minimum etch size where $\Delta y_{proof\ mass\ displacement}$ is a displacement of the proof mass, $\Delta y_{extension\ displacement}$ is a displacement of the extension in response to the proof mass displacement, and Abs is an absolute value function. With a non-zero displacement of the extension, the proof mass may have a displacement less than or equal to the minimum etch size. In an example, the minimum etch size may define the stop gap. In an example, an absolute value of the maximum displacement of the proof mass plus an absolute value of the maximum displacement of the extension which results from the maximum displacement of the proof mass may be less than or equal to the minimum etch size.

The compliant spring structure 106 may also have an extension 134 that operates in a manner similar to that of extension 130. The extension 134 may contact the proof mass 102 to stop the motion of the proof mass 102 if the proof mass 102 moves in a -y direction as a result of acceleration. The extension 134 may contact the proof mass on a surface 206 of the proof mass 102 and operate to stop the proof mass 102 in the stop gap less than the minimum etch size similar to that described with respect to the extension 130.

Figure 3:
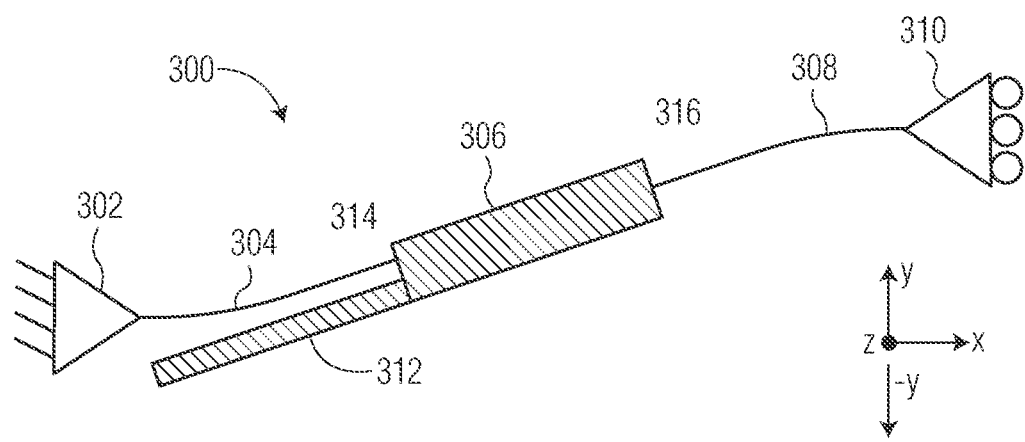
FIG. 3 is an example of a schematic view of principles of operation of a compliant spring structure of the MEMS accelerator in accordance with an exemplary embodiment of the invention.

FIG. 3 is an example of a schematic view 300 of principles of operation of the compliant spring structure 106 according to an exemplary embodiment of the invention. The principles of operation is based on the motion of the proof mass 102 in response to an acceleration moving in one direction and rigid structure 110 of the compliant spring structure 106 rotating which causes the extension 130 to move in an opposite direction to define the stop gap for the proof mass 102 rather than the stop gap being the minimum etch size of the semiconductor process which the proof mass 102 moves.

The schematic view 300 models the compliant spring structure 106 as a cantilever spring structure with a flexible beam 304, a rigid center mass 306, and a flexible beam 308 with stiffness k defined by the beam 112, rigid structure 110, and beam 108 respectively in the accelerometer 100. End 302 of the beam 304 may be fixed to a reference such as to the spring anchor 114 while the other end 314 of the beam 304 may be coupled to the rigid center mass 306. Further, end 310 of the beam 308 may be coupled to a moving mass such as the proof mass 102 while end 316 of the beam 308 may be coupled to the rigid center mass 306. The beam 308 may flex based on movement of the proof mass 102 mass in a y direction in response to an acceleration. The flexing may cause the rigid center mass 306 to rotate in a z axis which is orthogonal to the x and y directions. The flexing and rotation may be example deformations of the compliant spring structure 106. The rigid center mass 306 may have an extension 312 which converts the rotation of the rigid center mass 306 to a y axis motion in an opposite direction to the motion of the proof mass 102 in response to the motion of the proof mass 102. Based on the motion of the proof mass 102, the extension 312 may move and eventually contact the proof mass 102 and stop travel of the proof mass 102. The motion of the proof mass 102 in the y direction and the motion of the extension 312 in the opposite y direction result in a total displacement of the proof mass 102 and the extension 312 to be substantially the minimum etch size but the stop gap may be less than the minimum etch size.

In an example, an absolute displacement of the extension 312 and proof mass 102 may be no greater than the minimum etch size of the semiconductor process. A length of the extension 312 may determine a distance when the extension 312 contacts the proof mass 102 and stops the proof mass 102. If the length of the extension 312 is long, the proof mass 102 travels a shorter distance before being stopped by the extension 312 compared to the displacement of the extension 312. If the length of the extension 312 is short, the proof mass 102 travels a longer distance before being stopped by the extension 312 compared to the displacement of the extension 312.

Figure 4:
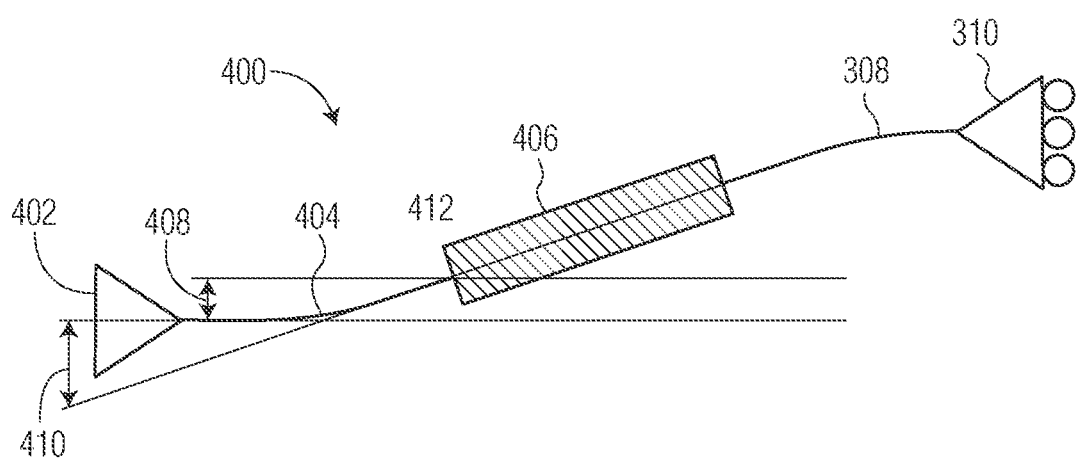
FIG. 4 is an example of a schematic view of principles of operation of motion amplification of the compliant spring structure in accordance with an exemplary embodiment of the invention.

FIG. 4 is an example of a schematic view 400 of principles of operation of a motion amplifier in accordance with an exemplary embodiment of the invention. The schematic view 400 shows the rigid center mass 406 coupled to a beam 404. One end 402 of the beam 404 may be coupled to a fixed reference such as the anchor 114 and another end 412 of the beam 404 may be coupled to the rigid center mass 406. The rigid center mass 406 may have a displacement 408 in the y direction resulting from motion of the proof mass 102 such as an acceleration but this displacement may increase as a distance from the rigid center mass 406 increases as shown by displacement 410. The increase in displacement is a motion amplification of the displacement 408. A length of the extension 312 may be adjusted based on a desired amount of the motion amplification to achieve a desired stop gap size. A longer extension 312 may reduce a stop gap size while a shorter extension 312 may increase a stop gap size.

Figure 5:
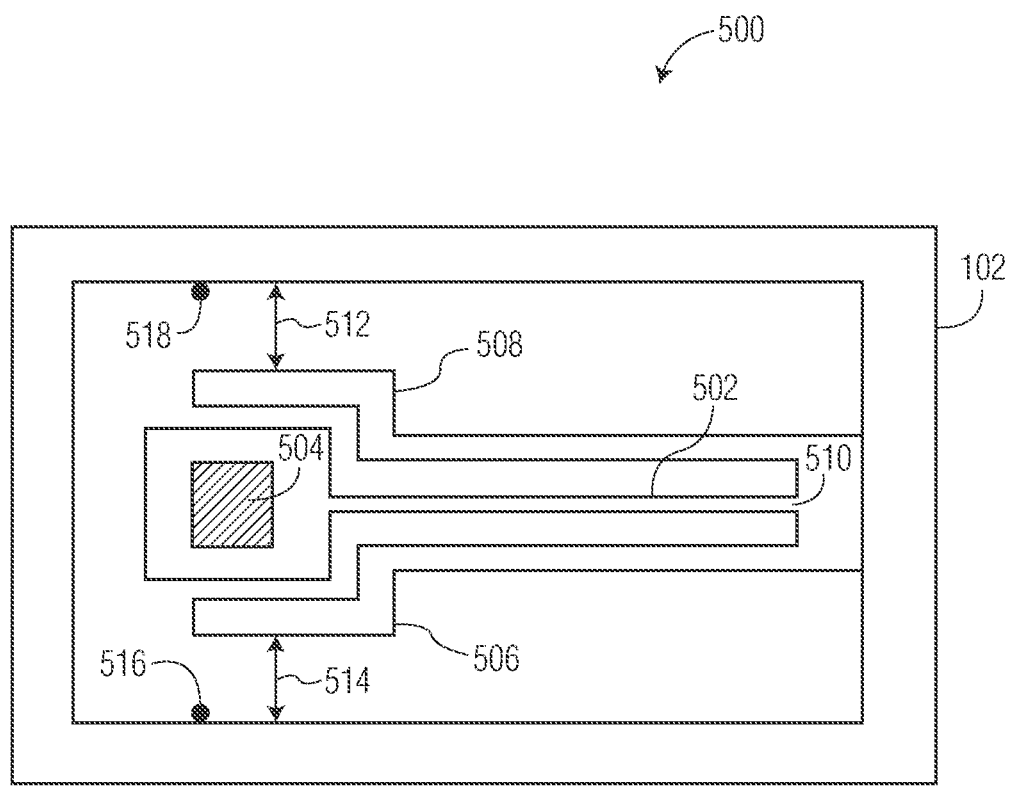
FIG. 5 is an alternative example of the compliant spring structure in accordance with an exemplary embodiment of the invention.

FIG. 5 is an alternative example of the compliant spring structure 500 in accordance with an exemplary embodiment of the invention. The compliant spring structure 500 which is arranged in the proof mass 102 produces a softer spring constant compared to the compliant spring structure 106. The compliant spring structure 500 may have a beam 502 and extensions 506, 508. One end of the beam 502 may be coupled to the anchor 504 while another end of the beam 502 may be coupled to the extensions 506, 508 at a coupler 510. One end of the extensions 506, 508 may be coupled to the proof mass 102 and another end of the extension 506, 508 may be coupled to the beam 502 at the coupler 510. The extensions 506, 508 may move in a direction opposite to motion of the proof mass 102 as a result of acceleration to contact the proof mass 102. A separation 514 may determine a distance between the proof mass 102 and the extension 506. Similarly, a separation 512 may determine a distance between the proof mass 102 and the extension 508. The compliant spring structure 500 and proof mass 102 is shown not subject to an acceleration such that the separation 514, 512 in an example is equal to the minimum etch size but will vary based on acceleration and result in the extensions 506, 508 contacting the proof mass 102 at point 516 or point 518 respectively on the proof mass 102 depending on a direction of movement of the proof mass 102. Further, a length of the extension 506, 508 may determine a size of a stop gap which is smaller than a minimum etch size associated with a fabrication process for the MEMS accelerometer 100. In an example, a 1.0 um movement of the proof mass 102 coupled to the compliant spring structure 500 in the +y direction may cause the extension 506, 508 to moves -0.5 um in the -y direction. If the minimum etch size is 1.5 um, the extension 506, 508 may stop the proof mass 102 from moving after 1.0 um of travel. This design has reduced the stop gap by -33%.

Figure 6:
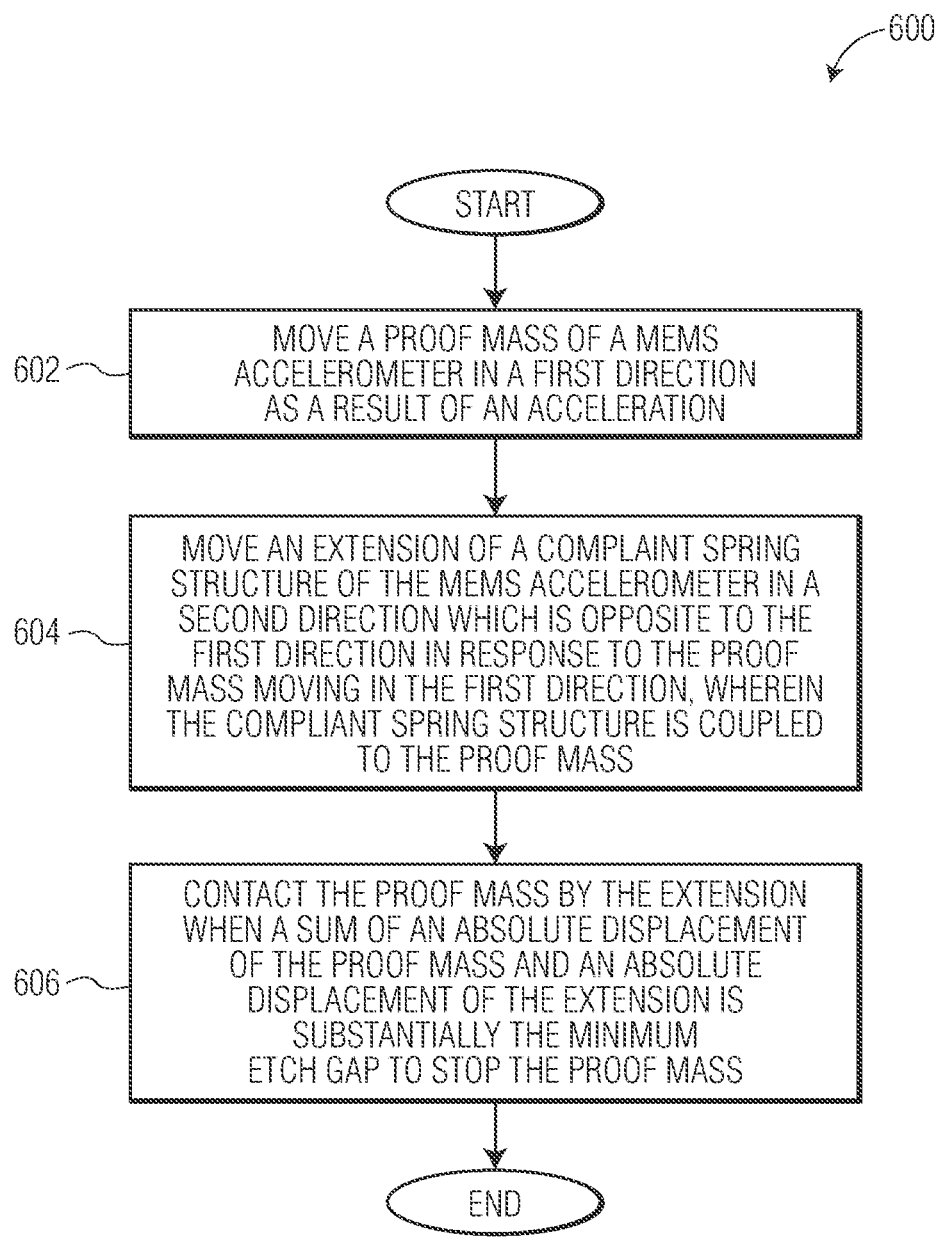
FIG. 6 is a flow chart of functions associated of operation of the MEMS accelerometer in accordance with an exemplary embodiment of the invention.

FIG. 6 is a flow chart of functions 600 associated with operation of the MEMS accelerometer 100 in accordance with an exemplary embodiment of the invention. At 602, a proof mass 102 of the MEMS accelerometer 100 moves in a first direction in response to an acceleration. The first direction may be a linear direction which corresponds to a +y or -y direction. At 604, an extension 130, 134 of the compliant spring structure 106 of the MEMS accelerometer 100 moves in a second direction which is opposite to the first direction in response to the proof mass 102 moving in the first direction. In an example, the compliant spring structure 106 may be coupled to the proof mass 102. Further, in an example, the motion of the proof mass 102 causes the beam 108 to flex, which causes a rotation of a rigid structure 110 of the complaint spring structure 106 which causes the extension 130 to move in the opposite direction to the proof mass 102. At 606, the extension 130 contacts the proof mass 102 when a sum of an absolute displacement of the proof mass 102 and an absolute displacement of the extension 130 is substantially the minimum etch size to stop the proof mass 102. The minimum etch size may be based on a fabrication process of the MEMS accelerometer 100. The extension 130 may be coupled via an anchor 114 to a substrate 150 which stops the proof mass 102 from moving. In an example, the size of the stop gap may be less than the minimum etch size and a sum of a maximum absolute displacement of the proof mass 102 and a maximum absolute displacement of the extension 130 may be less than or equal to the minimum etch size.

In one embodiment, a microelectromechanical systems (MEMS) accelerometer is disclosed. The MEMS accelerometer comprises: a compliant spring structure comprising a first beam, a second beam, and a rigid structure, wherein one end of the first beam and one end of the second beam are coupled to the rigid structure, a proof mass coupled to another end of the second beam; and a spring anchor coupled to another end of the first beam; wherein in response to the proof mass moving, an extension coupled to the rigid structure moves in an opposite direction to the motion of the proof mass to contact the proof mass and stop the movement of the proof mass. In an embodiment, the rigid structure rotates in an orthogonal direction to the motion of the proof mass which causes the extension to move in the opposite direction. In an embodiment, a maximum displacement of the proof mass is less than a minimum etch size of a fabrication process of the MEMS accelerometer. In an embodiment, a sum of maximum displacement of the proof mass and maximum displacement of the extension is less than or equal to a minimum etch size. In an embodiment, the MEMS accelerometer further comprises a sense finger to sense a capacitance between the sense finger and the proof mass, wherein the capacitance as a function of time is indicative of an acceleration of the proof mass. In an embodiment, a sense gap between the sense finger and the proof mass is greater than a minimum etch size of a fabrication process of the MEMS accelerometer. In an embodiment, the ends of the first beam and the second beam are along a longitudinal direction of the first beam and the second beam. In an embodiment, the spring anchor is anchored to a substrate. In an embodiment, a length of the extension determines a displacement of the extension based on the motion of the proof mass. In an embodiment, as the length of the extension increases a displacement of the proof mass before the extension contacts the proof mass decreases.

In another embodiment, a method is disclosed. The method comprises moving a proof mass of an MEMS accelerometer in a first direction in response to an acceleration; moving an extension of a compliant spring structure of the MEMS accelerometer in a second direction opposite to the first direction in response to the proof mass moving in the first direction, wherein the compliant spring structure is coupled to the proof mass; and contacting by the extension the proof mass when a sum of absolute displacement of the proof mass and an absolute displacement of the extension is less than or equal to a minimum etch size to stop the proof mass. In an embodiment, moving the extension comprises rotating a rigid structure of the compliant spring structure in an orthogonal direction to the motion of the proof mass which causes the extension to move in the opposite direction. In an embodiment, a maximum displacement of the proof mass is less than a minimum etch size of a fabrication process of the MEMS accelerometer. In an embodiment, a sum of maximum displacement of the proof mass and maximum displacement of the extension is equal to the minimum etch size. In an embodiment, the method further comprises sensing by a sense finger a capacitance between the sense finger and the proof mass, wherein the capacitance as a function of time is indicative of movement of the proof mass. In an embodiment, a sense gap between the sense finger and the proof mass is greater than a minimum etch size of a fabrication process of the MEMS accelerometer. In an embodiment, the sense finger is anchored to a substrate. In an embodiment, a spring anchor anchors the compliant spring structure to a substrate. In an embodiment, a length of the extension determines a displacement of the extension based on the motion of the proof mass. In an embodiment, as the length of the extension increases a displacement of the proof mass before the extension contacts the proof mass decreases.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A microelectromechanical systems (MEMS) accelerometer comprising:
    a compliant spring structure comprising a first beam, a second beam, and a rigid structure, wherein one end of the first beam and one end of the second beam are coupled to the rigid structure and the rigid structure is arranged in between the one end of the first beam and the one end of the second beam;
    a proof mass coupled to another end of the second beam; and
    a spring anchor coupled to another end of the first beam;
    wherein in response to the proof mass moving, an extension coupled to the rigid structure moves in an opposite direction to the motion of the proof mass to contact the proof mass and stop the movement of the proof mass,
    wherein the ends of the first beam and the second beam are along a longitudinal direction of the first beam and the second beam.

2. The MEMS accelerometer of claim 1, wherein the rigid structure rotates in an orthogonal direction to the motion of the proof mass which causes the extension to move in the opposite direction.

3. The MEMS accelerometer of claim 1, wherein a maximum displacement of the proof mass is less than a minimum etch size of a fabrication process of the MEMS accelerometer.

4. The MEMS accelerometer of claim 1, wherein a sum of maximum displacement of the proof mass and maximum displacement of the extension is less than or equal to a minimum etch size.

5. The MEMS accelerometer of claim 1, further comprising a sense finger to sense a capacitance between the sense finger and the proof mass, wherein a differential of the capacitance is indicative of an acceleration of the proof mass.

6. The MEMS accelerometer of claim 5, wherein a sense gap between the sense finger and the proof mass is greater than a minimum etch size of a fabrication process of the MEMS accelerometer.

7. The MEMS accelerometer of claim 1, wherein the spring anchor is anchored to a substrate.

8. The MEMS accelerometer of claim 1, wherein a length of the extension determines a displacement of the extension based on the motion of the proof mass.

9. The MEMS accelerometer of claim 8, wherein a length of the extension is inversely proportional to a displacement of the proof mass before the extension contacts the proof mass.

10. The MEMS accelerometer of claim 1, wherein the spring anchor is directly coupled to the other end of the first beam and not directly coupled to any end of the second beam.

* * * * *